United States Patent [19]
Peterson

[11] Patent Number: 5,864,472
[45] Date of Patent: Jan. 26, 1999

[54] APPARATUS FOR CONTROLLING A MULTIRESONANT SELF-OSCILLATING CONVERTER CIRCUIT

[75] Inventor: William Peterson, Vestal, N.Y.

[73] Assignee: Ault Incorporated, Minneapolis, Minn.

[21] Appl. No.: 826,092

[22] Filed: Mar. 24, 1997

[51] Int. Cl.$^6$ .......................... H02M 3/335; H02M 1/12; H02M 3/24

[52] U.S. Cl. ............................. 363/18; 363/18; 363/97; 363/49

[58] Field of Search .................... 363/16, 17, 18, 363/49, 56, 131, 132, 97, 98

[56] References Cited

U.S. PATENT DOCUMENTS

| | | | |
|---|---|---|---|
| 3,596,165 | 7/1971 | Andrews | 321/2 |
| 4,692,851 | 9/1987 | Attwood | 363/16 |
| 4,814,962 | 3/1989 | Magalheas et al. | 363/16 |
| 4,860,189 | 8/1989 | Hitchcock | 363/132 |
| 4,864,479 | 9/1989 | Steigerwald et al. | 363/17 |
| 4,945,467 | 7/1990 | Bhagwat | 363/132 |
| 5,303,137 | 4/1994 | Peterson | 363/16 |
| 5,305,191 | 4/1994 | Loftus, Jr. | 363/17 |
| 5,541,828 | 7/1996 | Rozman | 363/97 |
| 5,654,880 | 8/1997 | Brkovic et al. | 363/17 |
| 5,675,485 | 10/1997 | Seong | 363/97 |
| 5,703,765 | 12/1997 | Preis | 363/97 |

FOREIGN PATENT DOCUMENTS

| | | |
|---|---|---|
| 1 638 310 | 3/1971 | Germany . |
| 2 036 866 | 4/1971 | Germany . |
| 60-167683 | 8/1985 | Japan ........................ H02M 7/06 |

OTHER PUBLICATIONS

Nonlinear Analysis of a Family of LC Tuned Inverters, F. C. Y. Lee and T. G. Wilson, PESC 74 Record, pp. 223–231, Jun. 10, 1974.

"A New Family of Isolated Zero–Voltage–Switched Converters," R. Farrington, M. M. Javonovic and F. C. Lee, 1991 IEEE 0–7803–0900–4/91/0700–0209, pp. 209–215, Apr. 1991.

"Comparative Study of Voltage–Mode Resonant Converters with Transformers," T. Nimomiya, T. Higashi, M. Nakahara and K. Harada, IEEE 0–7803–0900–4/91–0700–0474, pp. 474–480, Apr. 1991.

*Primary Examiner*—Peter S. Wong
*Assistant Examiner*—Bao Q. Vu
*Attorney, Agent, or Firm*—Merchant, Gould, Smith, Edell, Welter & Schmidt, P.A.

[57] ABSTRACT

A direct current to direct current converter utilizes a MOSFET half-bridge configuration in which the inherent magnetizing and leakage inductances of the transformer are used as the only inductances in the frequency-determining circuit. Diodes are used to limit the voltages across the capacitor of the frequency determining circuit and hence limit the short circuit and open circuit characteristics of the converter. A self-starting circuit insures that the circuit will start up when initially energized. Regulation of the circuit is provided by varying the on times of at least one of the two MOSFET transistors in the half-bridge configuration.

8 Claims, 13 Drawing Sheets

Unregulated Q2 Gate

FIG. 4B

Q2 Regulated Gate of Q2

FIG. 4C

Q1,Q2 Regulated. Q2 Gate.

FIG. 5A

Unreulated. Pin I of T I

FIG. 5B

Q2 Regulated. Pin 1 of T1

FIG. 5C

Q1,Q2 Regulated. Pin 1 of T1

Unregulated. CR7 Output. 2A/Div.

FIG. 7B

Q2 Regulated. CR7 Output Current. 2A/Div.

FIG. 7C

Q1,Q2 Regulated. CR7 Output Current. 2A/Div.

APPARATUS FOR CONTROLLING A MULTIRESONANT SELF-OSCILLATING CONVERTER CIRCUIT

TECHNICAL FIELD

This invention relates to direct-current-to-direct-current power supplies; more particularly to a simple, inexpensive power converter which provides improved short circuit and open circuit operation; and more particularly still to a regulated multi-resonant self-oscillating converter circuit.

BACKGROUND

Electronic equipment for business and entertainment has proliferated in recent years. This proliferation has resulted in an increase in the need for small, inexpensive and efficient power supplies. One common type of power supply is a dc-to-dc converter. As will be appreciated by those of skill in the art, this type of converter accepts electrical power at one voltage level, converts it to high frequency alternating current, uses a transformer to adjust the voltage level and isolate the power source from the electronic load, and rectifies the resulting alternating current to direct current. Such converters are simple, low cost means for providing the power required by electronic equipment. The reason that a high frequency alternating current is used as an intermediate step is to reduce the size of the required transformer.

Converters are often used to power portable equipment or to recharge batteries either internally in the equipment or externally. Some dc-to-dc power supplies are powered by standard household current rectified to provide the direct current input. These types of supplies often take the form of plug-mounted structures where the entire power supply is supported by the electrical connector pins on the plug.

In power supplies such as plug-mounted converters, size, weight and cost are several of the important criteria in designing the converter. For example, if the number of components can be reduced, then the size and complexity of the converter can also be reduced. In the past, it has been found that resonant, self-oscillating dc-to-dc converters may meet many of the requirement of such plug-mounted converter applications. One type of converter is a push-pull converter. These types of converters are discussed in more detail in the background of U.S. Pat. No. 5,303,137 issued to Peterson, the specification of which is hereby incorporated herein by reference. One drawback of these prior art converters, however, is that they require either expensive and lossy square loop magnetics or complicated control circuitry. This has the effect of increasing the size and weight of the converters. Moreover, these prior art converters also have poor short circuit and/or open circuit characteristics, requiring expensive and complicated special overload protection control circuitry.

An improvement to these converters is disclosed in U.S. Pat. No. 5,303,137 to Peterson, which was incorporated by reference above. This patent discloses a small, compact dc-to-dc converter using a half-bridge configuration. The frequency-determining circuit of the power supply requires only the inherent magnetizing and leakage inductance of the transformer and no separate conductive elements. However, the circuit operates better when using a regulated circuit in order to properly operate the electronics of the device to which the power supply is attached.

Accordingly, there arises a need to for an improved regulated multi-resonant self-oscillating converter circuit. The present invention directly addresses and overcomes the shortcomings of the prior art.

SUMMARY

The present invention provides for a regulated resonant self-oscillating converter circuit. The regulation characteristics do not adversely affect the circuit. Instead, the regulation is accomplished by adjusting the "on" time of at least one of the two transistors in the half-bridge of the converter circuit.

In a preferred embodiment constructed in accordance with the invention, the converter has the form of a frequency-determining circuit requiring only the inherent magnetizing and leakage inductance of a transformer and no separate inductive element. Open circuit and short circuit operation are improved by clamping the voltage across the frequency-determining capacitor to a voltage which is less than the input direct-current voltage. This lower voltage level is obtained by autotransformer action in which the capacitor is connected to an intermediate point on the transformer winding (across which the full input direct current voltage is applied). This clamps the maximum voltage across the capacitor to a voltage determined by the so-called "tap up" ratio of the autotransformer winding. The resulting reduction in capacitor voltage, in turn, reduces the maximum short circuit current through the load to a safe value. To initiate oscillations in the converter circuit, a start-up circuit comprising a zener diode and a silicon controlled rectifier applies a turn-on signal to one of the transistors in the half-bridge when the circuit is energized.

The principle used to regulate the output voltage is frequency modulation. It will be appreciated that the unregulated circuit is a series-parallel three element resonant circuit operating above resonance. The regulation circuit causes the frequency to increase further above the resonant frequency. Therefore, the amount of energy that is transferred from the input to the output is reduced. The regulation circuit includes two main functional elements.

First, error signal means are provided for generating an error signal responsive to the deviation of the output voltage from the desired level. In the preferred embodiment, the error signal is a linear voltage created by applying the output voltage to a voltage divider and then to a circuit that subtracts the difference and amplifies the difference (e.g., an error amplifier). The error signal is then provided to the input (or LED) of an optical isolator transistor—which is functionally part of the second functional element.

The second functional element comprises a variable frequency controller means. In the preferred embodiment, the frequency controller means includes a transistor which utilizes the isolated error signal as the base input. The error amp provides a signal which turns off at least one of the switching transistors in the half-bridge configuration more quickly than it would have in the self-oscillating non-regulated mode.

A major advantage of the regulated converter circuit of the present invention is the ability to place all of the necessary components into a small, lightweight package particularly suitable for plug mounted power supplies used for battery recharging and for powering portable electronic equipment.

Another major advantage of the regulated converter circuit of the present invention is the inherent overload performance of the voltage clamping feature by means of which the overload current is limited to a safe value. Over current regulation is achieved by varying the on times of at least one of the two transistors in the half-bridge.

Therefore, according to one aspect of the invention, there is provided a regulated direct current power converter, comprising: a single transformer having primary and load windings; at least two transistors in a half-bridge configuration cooperatively connected to said primary winding of said single transformer; a feedback path for producing oscillations in said transistors and including said primary winding of said single transformer; a load output connected to said load windings; error signal generation means, operatively connected across said load output, for generating an error signal related to the voltage across said load output; and frequency controller means, operatively connected to said error signal means and at least one of said transistors, for receiving said error signal and for changing the on time of at least one of said transistors, wherein the error signal is decreased and the power converter is regulated.

According to another aspect of the invention, there is provided the regulated power converter as described in the preceding paragraph, and further including a series inductance effectively connected in series with said load output and a shunt inductance effectively connected and parallel with said load output; and a capacitor effectively connected in series with both said series inductance and said parallel inductance; said capacitor being connected between an intermediate point on one of said primary winding and said source of direct current voltage.

According to yet another aspect of the invention, there is provided the regulated power converter as described and further including a multi-resonant circuit in said feedback path and voltage limiting means connected between said source of direct current voltage and one end of said one primary winding for limiting the voltage across said capacitor to a voltage substantially less than said source of direct current voltage.

According to another aspect of the invention, there is provided a regulated direct current power converter, comprising: a source of direct current voltage; a single transformer having a primary winding and a load winding; a pair of transistors connected in a half-bridge configuration across said primary winding of said single transformer; a feedback path for producing oscillations in said transistors and including said primary winding of said single transformer; a multi-resonant circuit in said feedback path and including a series inductance effectively connected in series with said load and a shunt inductance effectively connected and parallel with said load, and a capacitor effectively connected in series with both said series inductance and said parallel inductance; said capacitor being connected between an intermediate point on one of said primary winding and said source of direct current voltage; and voltage limiting means connected between said source of direct current voltage and one end of said one primary winding for limiting the voltage across said capacitor to a voltage substantially less than said source of direct current voltage; error signal generation means, operatively connected across said load, for generating an error signal related to the voltage across said load; and frequency controller means, operatively connected to said error signal means and at least one of said pair of transistors, for receiving said error signal and for changing the on time of at least one of said pair of transistors, wherein the error signal is decreased and the power converter is regulated.

These and other advantages and features which characterize the present invention will be further described in the drawing and detailed description set forth below.

BRIEF DESCRIPTION OF THE DRAWING

In the drawing, wherein like numerals represent like components throughout the several views.

DETAILED DESCRIPTION

Figure 1:
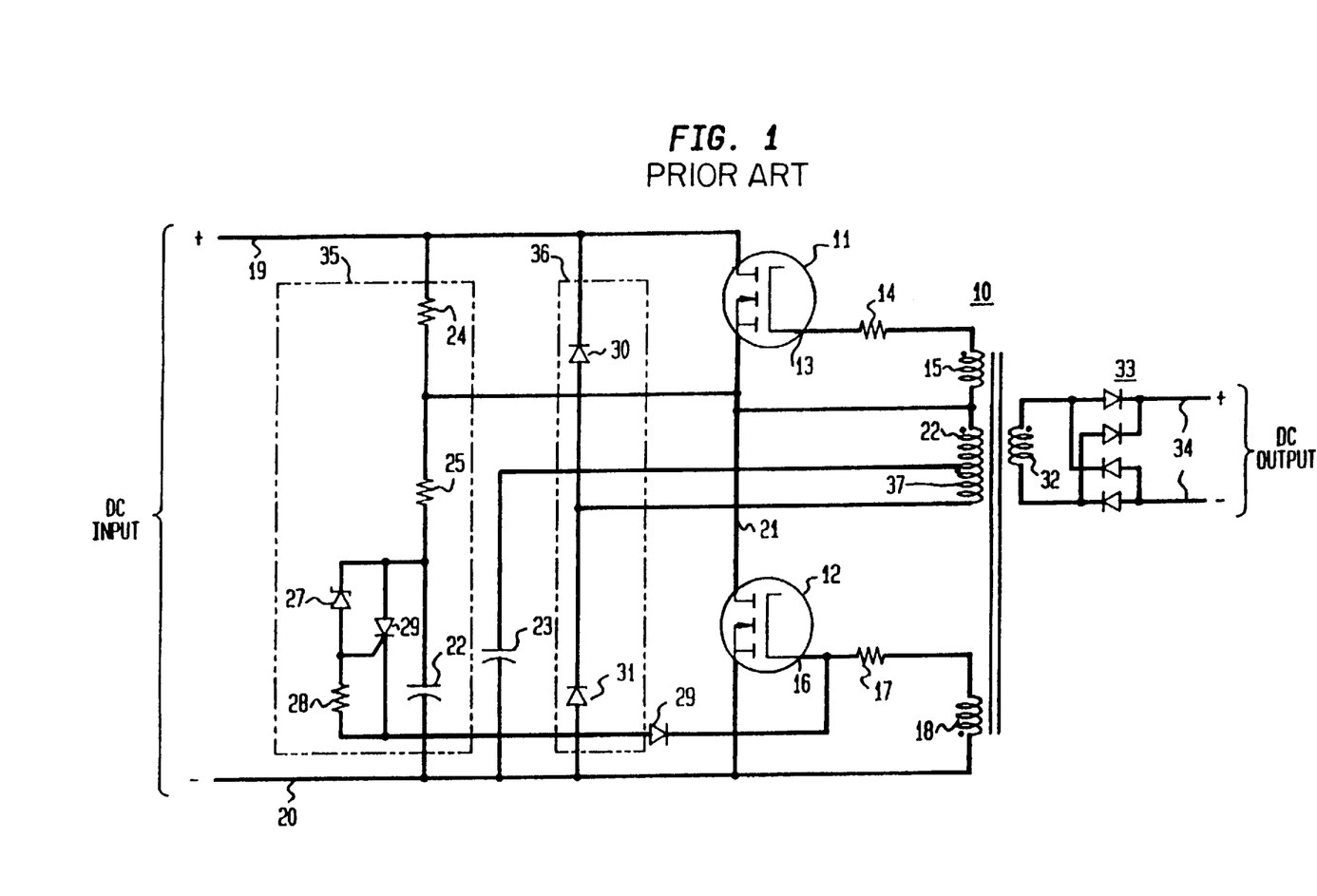
FIG. 1 shows a detailed circuit diagram of a half-bridge converter circuit.

Referring first to FIG. 1 there is shown a schematic diagram of a dc-to-dc converter which is more fully disclosed in U.S. Pat. No. 5,303,137. The converter comprises a transformer 10 and two MOSFET transistors 11 and 12. The gate 13 of transistor 11 is connected through resistor 14 to the upper end of a driver winding 15 of transformer 10 while the gate 16 of transistor 12 is connected through resistor 17 to the opposite end of drive winding 18 of transformer 10. A direct current source is connected between conductors 19 and 20, in turn, connected across the drain to source series connected transistors 11 and 12. The common source-drain connection 21 of transistors 11 and 12 is connected to the midpoint of resistors 24 and 25 as well as to the primary winding 22 of transformer 10. The secondary winding 32 of transformer 10 is connected to a full-wave rectifier 33 to provide a direct current voltage at output leads 34.

Transistors 11 and 12 form a "half-bridge" connection to alternately connect the direct current voltage on conductors 19 and 20 to one end of primary winding 22. The other end of primary winding 22 is connected to one side of capacitor 23 which, in turn, is connected to the negative conductor 20 from the direct current source. The other end of primary winding 22 is connected to the clamp winding 37 of transformer 10. The other end of clamp winding 37 is connected to a voltage clamping circuit 36 including diodes 30 and 31 connected in series between the supply conductors 19 and 20. The lower end of clamp winding 37 is connected to the midpoint of diodes 30 and 31. The operation of the clamping circuit 36 will be discussed in detail in connection with FIG. 2.

The alternating current voltage across winding 22 is coupled by transformer action to the gate drive windings 15 and 18 and, through resistors 14 and 17, to gates 13 and 16, respectively. The polarity of the gate drive windings 15 and 18 is such as to provide positive feedback to transistors 11 and 12. That is, when either of transistors 11 and 12 begins to conduct, the voltage across its gate drive winding (15 or 18) tends to drive the transistor into greater conduction, and when either of transistors 11 and 12 starts to reduce conduction, the voltage across its gate drive winding tends to cut the transistor off.

Assuming that MOSFET transistor 12 is conducting, transistor 11 is cut off, and that the charge on capacitor 23 is positive at the connection to winding 22, the voltage on capacitor 23 is applied to the winding 22, negative at the dot at the top of winding 22. This voltage is coupled to gate drive windings 15 and 18, also negative at the dot at the top of winding 15 and negative at the dot at the bottom of winding 18. The voltage from winding 18 is applied through resistor 17 to the gate 16 of transistor 12 to drive transistor 12 further into conduction. At the same time, the voltage from winding 15 is applied through resistor 14 to the gate 13 of transistor 11, tending to cut transistor 11 off. This process continues until transistor 12 saturates and the current can no longer grow. Due to the magnetizing inductance of transformer 10, and the reflected load current, current continues to flow in winding 22, discharging capacitor 23 and reducing the voltage across winding 22. The reduction in voltage across winding 22, in turn, is coupled to the gate windings 15 and 18. When the voltage on gate drive winding 18 is insufficient to maintain transistor 12 fully conducting, transistor 12 will start to turn off. The reduction in current in the magnetizing inductance of transformer 10 is opposed by the energy stored in the magnetizing inductance, producing a reverse voltage across the magnetizing inductance and hence across winding 22. This voltage will be positive at the dots on transformer windings 22 and 37 and will tend to turn transistor 12 fully off and to turn transistor 11 on. This positive feedback continues until transistor 11 is saturated and transistor 12 is fully off.

At this point in time, the positive direct current conductor 19 is connected to the dot end of winding 22 by way of transistor 11 and center connection 21. The other end of primary winding 22 is connected to the now discharged capacitor 23. The voltage across winding 22 is coupled to winding 15 to rapidly drive transistor 11 into full saturation. At the same time, capacitor 23 charges toward the input voltage on conductor 19, thus reducing the voltage on primary winding 22. This reduction in voltage across primary winding 22 is coupled to gate drive winding 15 tending to reduce conduction in transistor 11. When the voltage on gate drive winding 15 is insufficient to maintain transistor 11 in full saturation, transistor 11 starts to turn off. At the same time, the voltage on gate drive winding 18 will tend to turn transistor 12 on. Eventually, transistor 11 is turned fully off and transistor 12 is driven into full saturation, thus returning to the starting condition assumed above. The above-described cycle is repeated endlessly, maintaining the switching action. Diodes 30 and 31 clamp the voltage on capacitor 23 to prevent excessive voltages if the Q of the resonant circuit formed by capacitor 23 and the magnetizing inductance of transformer 10 is too high. In effect, diodes 30 and 31 clamp the voltage on capacitor 23 to a voltage which is less than the input direct current voltage across conductors 19 and 20 by the turns ratio of winding 22 and winding 37, the so-called "tap up" ratio.

The half-wave converter of FIG. 1 has a stable condition when both transistors 11 and 12 are turned off, and this is the condition which the circuit assumes when first turned on. A start-up circuit 35 comprising resistors 24 and 25 and capacitor 22 is connected across conductors 19 and 20. Start-up circuit 35 further includes zener diode 27, resistor 28 and silicon controlled rectifier (SCR) 29. Start-up circuit 35 serves to initiate oscillations in the circuit of FIG. 1 when it is first energized. The application of any substantial voltage to conductors 19 and 20 charges capacitor 22, eventually causing zener diode 27 to break down. The resulting current flow into the gate of SCR 29 turns SCR 29 on. The voltage on capacitor 22 is then fed by SCR 29 through diode 29 to the gate 16 of transistor 12, turning transistor 12 on. At the same time, capacitor 23 is charged through resistor 24 and the upper portion of winding 22. These are the conditions assumed at the beginning of the description of the oscillatory action.

If the input voltage is insufficient for resonant oscillations to be sustained, then capacitor 22 will discharge through resistor 25 and winding 18. The value or resistor 17 is such that this discharge current is insufficient to maintain SCR 29 turned on and hence SCR 29 will turn off, returning the start-up circuit to the initial conditions. The start sequence will begin again if there is an adequate voltage across conductors 19 and 20, and will continue to repeat until the resonant circuit sustains oscillations. During sustained oscillations, the values of resistor 24 and capacitor 22 provide a "corner frequency" which prevents the high frequency signal generated during oscillations from producing a voltage magnitude on capacitor 22 sufficient to break down zener diode 27. In this way, the start up circuit is maintained inoperative when the circuit is oscillating.

Figure 2:
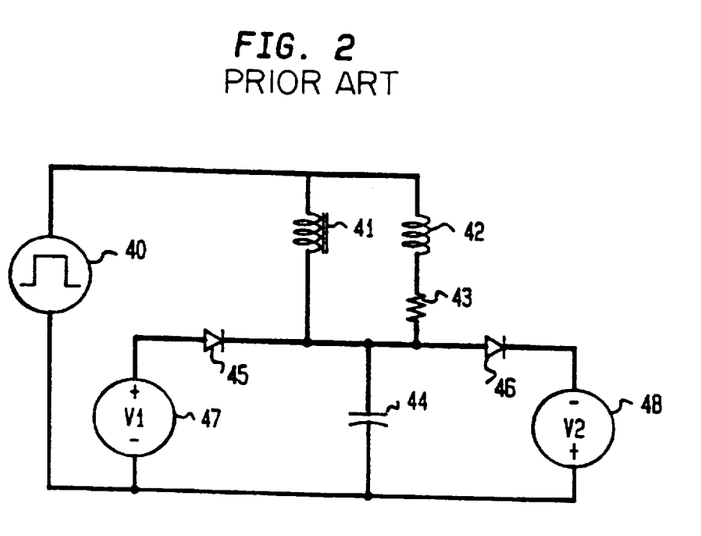
FIG. 2 shows an equivalent circuit for the converter circuit of FIG. 1.

The conditions required to maintain oscillations in the circuit of FIG. 1 includes the requirement that the ring through caused by the magnetizing current must be sufficient to initiate conduction of the other transistor. In FIG. 2 there is shown an equivalent circuit with the half bridge transistors replaced by a square wave source 40 Inductor 41 is the magnetizing inductance of the transformer 10 of FIG. 1. Inductor 42 is the leakage inductance between the primary and secondary windings of transformer 10. Resistor 43 represents the load resistance on the secondary of transformer 10 reflected by the turns ratio into the primary of the transformer. Capacitor 44 is the resonating capacitor, with its voltage limited by diodes 45 and 46 to the voltages represented by sources 47 (V1) and 48 (V2), respectively. The magnitudes of voltages V1 and V2 are equal and above ground (V1) and below the peak of the input voltage across conductors 19 and 20 (V2) by the primary tap up ratio.

The resonant circuit consists of the capacitor 44 in series with the parallel combination of magnetizing inductance 41 and the serial combination of the leakage inductance 42 and the reflected load resistance 43. If there is no load (resistor 43 is very large), leakage inductance 42 is essentially out of the circuit and the resonant circuit is the capacitor 44 in series with the magnetizing inductance 41. The resonant frequency at no load will therefore be at a minimum and the Q of the circuit will be at its highest. The voltage on capacitor 44 will be limited by diodes 45 and 46 and sources 47 and 48. This voltage appears across the load 43.

As the load is increased and the load resistor 43 is reduced in value, the effect of leakage inductance 42 is increased and the resonant frequency shifts toward the parallel combination of inductors 41 and 42. The increased current in the load 43 extracts energy from the resonant circuit, reducing the Q of the circuit. At full load, the Q of the circuit is reduced to the point where diodes 45 and 46 are just barely conducting. The peak voltage on the magnetizing inductance 41 remains constant and the voltage across the load resistance 43 is substantially constant, reduced only by the series impedance of the leakage inductance 42.

If the converter is over-loaded, the resistance of load 43 is reduced and the energy delivered by the resonant circuit to load 43 is also reduced. At short circuit, where resistor 43 is zero, the effective Q of the resonating circuit is again high. The voltage on capacitor 44 therefore increases until it is limited by conduction of diode 45 or diode 46. Diodes 46 and 46 therefore clamp the voltage across capacitor 44 to voltages supplied by sources 47 and 48, respectively. These clamping voltages 47 and 48 are less than the supply voltages connected to leads 19 and 20 of FIG. 1, and, indeed, are equal to the difference between these supply voltages on leads 19 and 20 and the voltage provided by the so-called "tap-up" voltage of transformer winding 22. During overload, the total inductance is the parallel combination of the magnetizing inductance 41 and the leakage inductance 42 and thus the frequency is at a maximum. The current delivered to the short circuit is fed through the leakage inductance 42 which, due to the higher frequency, limits this short circuit current to a safe value.

Figure 3:
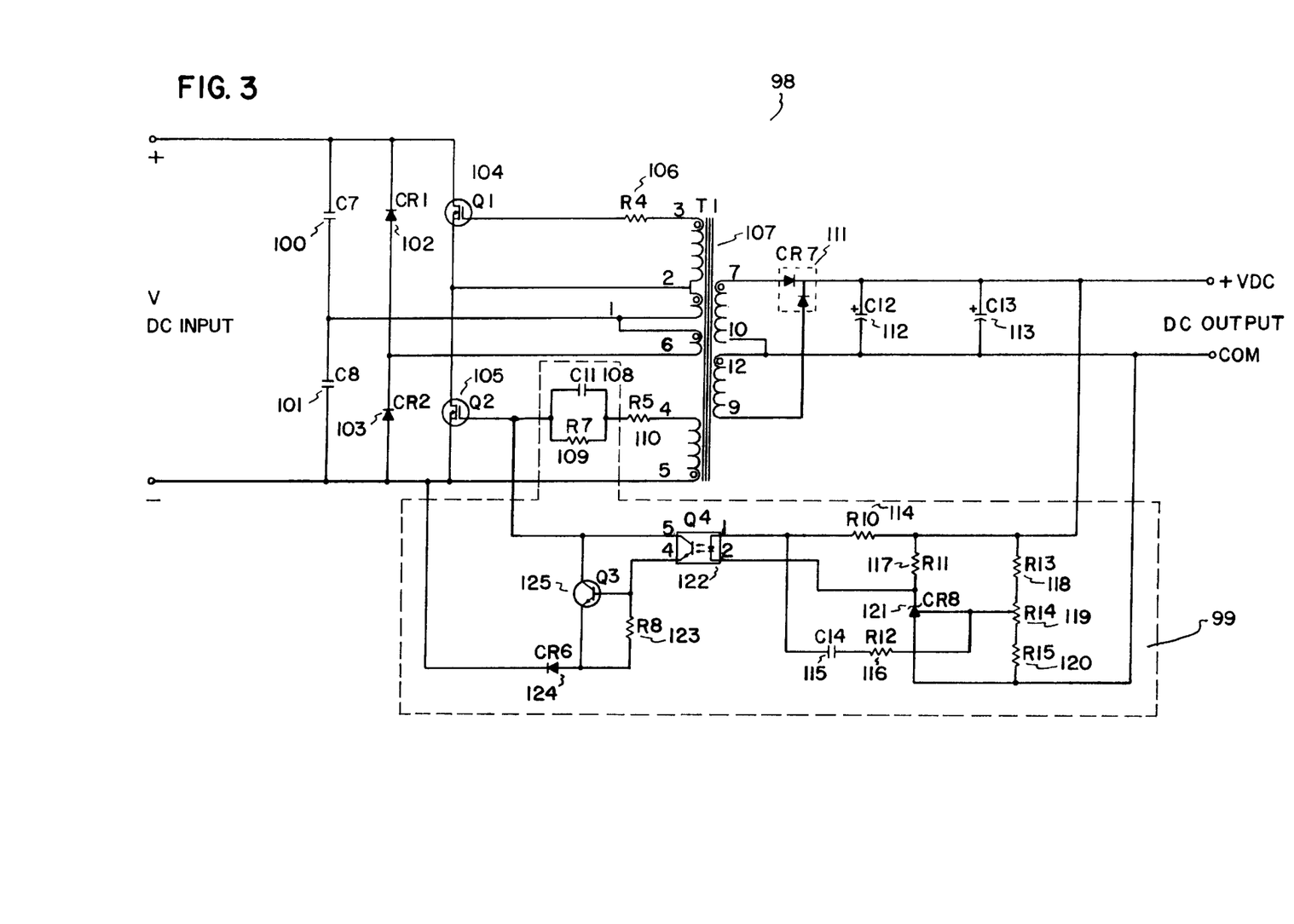
FIG. 3 is a detailed circuit diagram of a preferred embodiment regulated converter circuit constructed in accordance with the principles of the present invention, wherein the regulation frequency control circuit is applied to one transistor 105.
Figure 6:
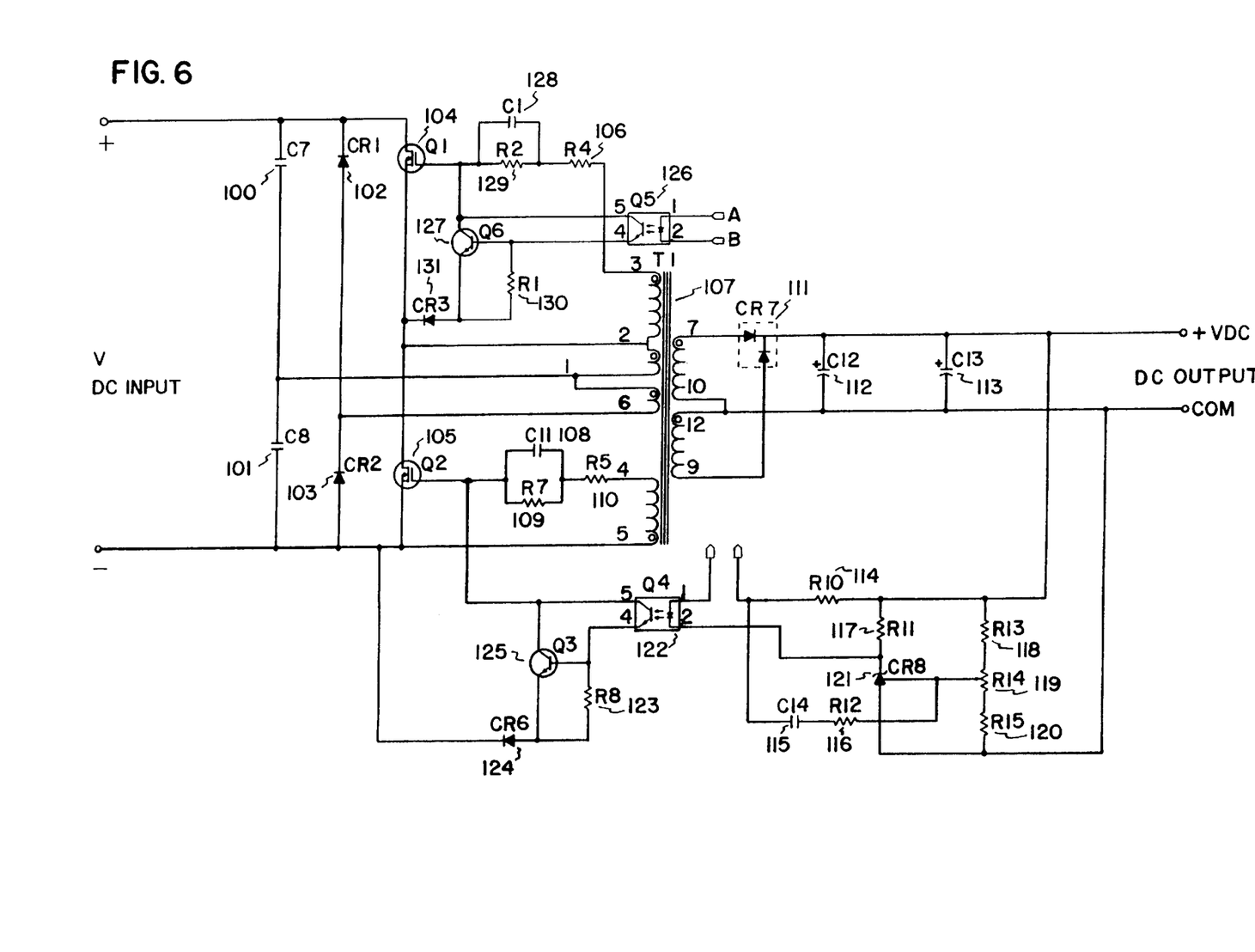
FIG. 6 is a schematic diagram for a regulated circuit constructed in accordance with the principles of the present invention utilizing frequency control on both transistors 104 and 105.

In FIGS. 3 and 6 there is shown a preferred embodiment of the invention to be used in a plug-mounted power supply operating from a standard 117 volt, 60 Hertz, alternating current source, and producing a nominal 24 volts of direct current at a delivered power level of 48 watts. In FIGS. 3 and 6, the alternating current input is delivered through a fuse (not shown) to a low pass filter (not shown). The low pass filter comprises a resistor and capacitor network to remove high frequency components of the input current. The filtered alternating current is applied to a full wave rectifier (not shown), wherein the output is provided across a smoothing capacitor. The rectified, smoothed voltage signal is applied as the voltage input of FIGS. 3 and 6.

The operating principles of the circuits of FIGS. 3 and 6 are similar to the circuit shown in FIG. 1, with the important exception that frequency control regulation is provided in the circuits of FIGS. 3 and 6.

First in FIG. 3, the overall circuit is designated generally at 98. The regulation or feedback control circuit is designated generally at 99. Beginning at the DC voltage input, there are two capacitors 100 and 101 in series across the input. The point between the capacitors is connected to a tap of the primary winding. Clamp winding 37 together with the two diodes 102 and 103 form a clamping means for the power supply circuit 98. MOSFET transistor devices 104 and 105 are also connected together across the voltage input (as are the primary windings of transformer 107). Capacitor 108 and resistor 109 are connected in parallel from the gate of transistor 105 through resistor 110 to the gate winding designated by the number 4. The gate of transistor 104 is connected to the primary winding tap designated by the number 3 through resistor 106.

On the secondary or load side of transformer 107 is a diode 111 with smoothing capacitors 112 and 113 across the DC voltage output.

Regulation circuit 99 is connected across the DC voltage output to sense the reference output voltage. The first functional portion of the regulation circuit acts to sense the output voltage and provide an error signal. The sensed voltage is provided across resistor voltage-divider network 118, 119 and 120. The divided down voltage is applied to the reference input of an integrated circuit reference amplifier 121 (or shunt regulator). Resistor 116 is connected from the input of device 121 to capacitor 115 to the output of device 121. Therefore, resistor 116 and capacitor 115 form a local feedback loop around device 121 to stabilize its operation. The output of device 121 is connected to one input of the second functional portion of the circuit. The voltage drop across resistor 117 is provided to the other input of the second functional portion of the circuit 99 (e.g., optical isolator device 122). Accordingly, the output signals of the first functional portion is provided to the second functional portion of the regulation circuit 99.

The second functional portion of the regulation circuit varies the frequency of the regulator by changing the on time of MOSFET 105. First, the optical isolator device 122 provides the error signal as the base drive current to transistor 125. The collector of transistor 125 is tied to the gate of FET transistor 105 at a point between resistor 109 and capacitor 108. As the base drive to transistor 125 varies, the voltage at the gate of FET transistor 105 varies, thereby turning off transistor 105 faster (or increasing the frequency).

Still referring to FIG. 3, the method of regulating the converter circuit 98 will be described. As noted above, the principle of regulating the output voltage is frequency modulation. It will be appreciated by those skilled in the art that the unregulated circuit described in connection with FIG. 1 is a series—parallel three element resonant circuit operating above resonance. As the regulation circuit causes the frequency to increase above the resonant frequency, the amount of energy that is transferred from the input to the output is reduced.

The regulation circuit 99 includes two main parts as noted above: the first functional portion or error detection means section and the second functional portion or circuit means for varying the frequency section. The circuit means used to vary the frequency includes transistor 125, device 122, capacitor 108, resistor 109, and diode 124. The frequency is increased by turning off MOSFET transistor 105 more rapidly than it would have turned off in the self oscillating non-regulated mode.

More specifically, regulation of the output voltage is accomplished in operation as follows. First, the output voltage is sensed by the error detection section of the circuit 99. If the output voltage goes higher than the desired output voltage, shunt regulator 121 will increase the current flowing through the LED of opto-isolator device 122. The increased current through opto-isolator device 122 causes increased current through transistor 125 and resistor 109. It will be appreciated that there is a resulting voltage drop across the parallel combination of resistor 109 and capacitor 108. This results in a less positive voltage waveform on the gate of the MOSFET transistor 105. The time that transistor 105 remains on is thereby reduced—and the frequency is increased. By increasing the frequency, the output voltage at the load terminals is reduced to the desired value. In the circuit of FIG. 3, the time that MOSFET transistor 104 remains on is relatively unchanged from the unregulated case as illustrated in FIG. 1.

Figure 4A:
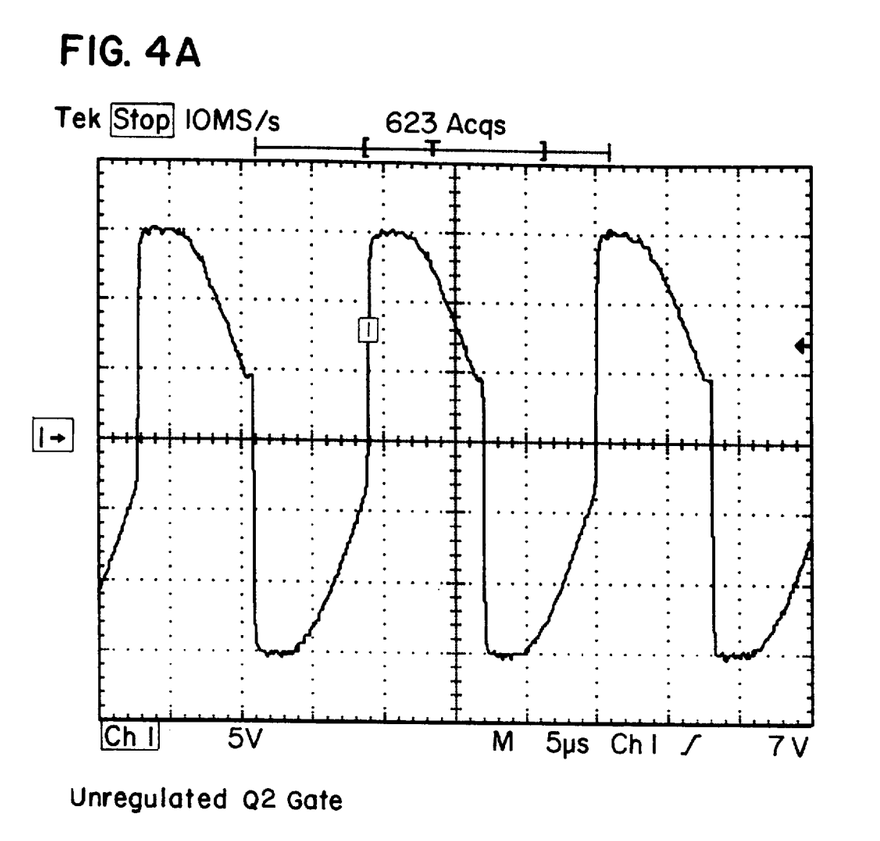
FIG. 4a is a graphical representation of the gate drive waveform of the unregulated (no frequency control circuit)

Referring to waveform FIG. 4a, it will be appreciated by those skilled in the art that the gate voltage "rolls off" at a rate determined by the resonant circuit, until the threshold is reached and it turns off. The regulation circuit effectively adds a DC voltage to this waveform (e.g., the IR drop on resistor 109) so that the threshold voltage intersects the slope earlier and hence turns off the transistor sooner. The slope of the gate waveform is used as the voltage to time conversion element.

In summary, the output voltage is reduced because the resonant capacitors 100 and 101 are not allowed to discharge through MOSFET transistor 105 as thoroughly as it would have in the unregulated case. The amplitude of the voltage waveform appearing across the primary winding of the transformer is therefore also reduced and the output voltage is thereby reduced.

Turning next to FIG. 6, it will be understood by those of skill in the art that the operation of the regulation circuit illustrated therein is similar to the circuit 99 of FIG. 3. However, the operation differs in that the output from the shunt regulator 121 is also provided to the input of photo-optical isolator transistor 126. The output of optical isolator device 126 is provided to the base of transistor 127 and the collector of transistor 127 is tied to the gate of MOSFET transistor 104. Thus, as the error signal varies, the base current to transistor 127 varies which in turn will effect the on time of transistor 104. As the on time varies, regulation of the circuit 98 occurs.

By adding the second set of frequency varying components in FIG. 6, the operation of the circuit is improved. In this second embodiment, in operation, the error portion of the circuit draws current through the input diode of both opto-isolators 122 and 126. Additionally, both MOSFET transistors 104 and 105 have shorter than normal conduction cycles. The voltage amplitude of the voltage across the resonant capacitors 100 and 101 is reduced because they are less completely charged and discharged with the reduced conduction time of transistors 104 and 105. With two circuits, the waveforms are more symmetrical at the output of the transformer which improves the output ripple voltage. Also, the non-symmetrical waveform causes a non-symmetrical flux to flow in the transformer 107 core. This causes more power loss in the transformer 107 resulting in increased transformer temperatures and reduced efficiency.

Figure 4B:
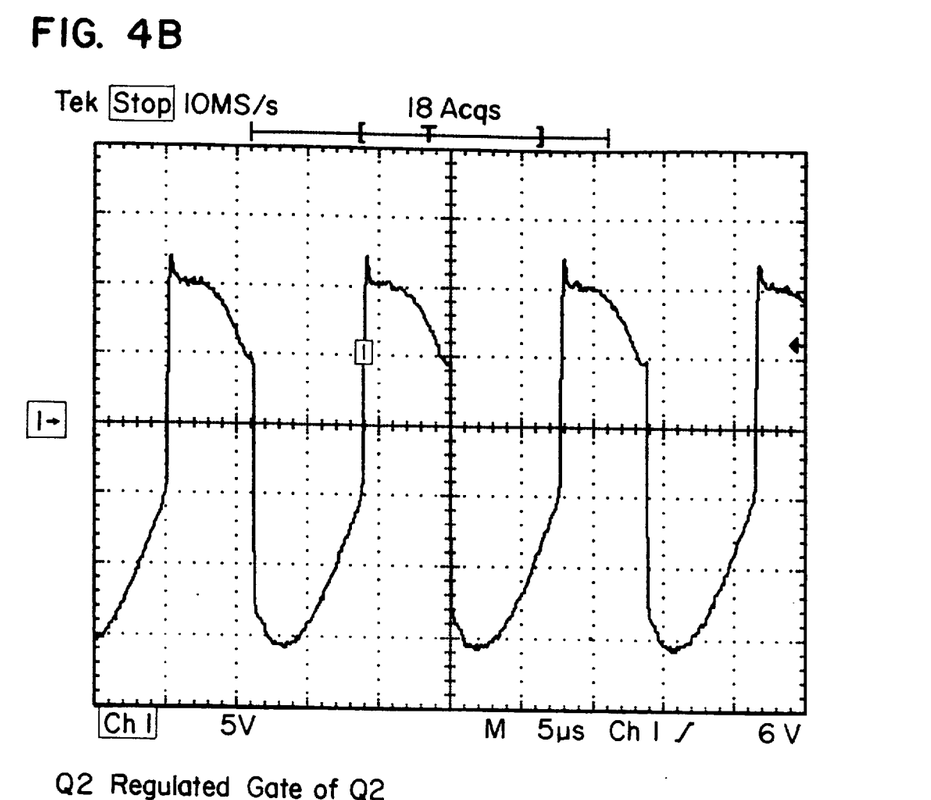
FIG. 4b is a graphical representation of the gate voltage waveform with the frequency control circuit of FIG. 4 applied to one transistor 105.
Figure 4C:
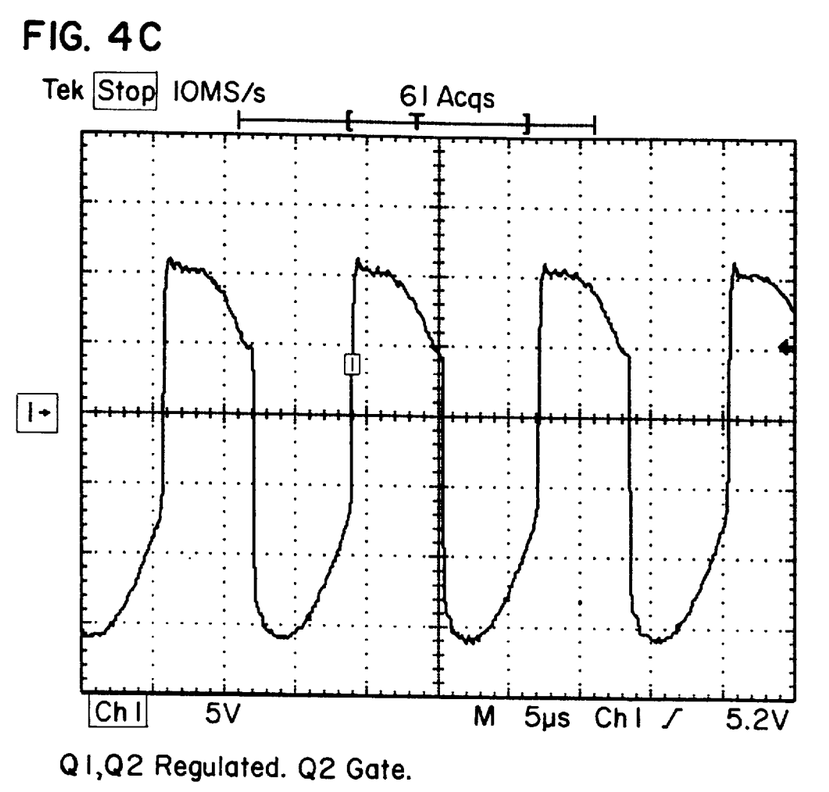
FIG. 4c is a graphical representation of the gate voltage waveform with the frequency control circuit of FIG. 4 applied to both transistors 104 and 105.

FIGS. 4a, 4b, and 4c illustrate the voltage waveform at the gate of MOSFET transistor 105. FIG. 4a illustrates the unregulated circuit, FIG. 4b illustrates the single regulated transistor circuit of FIG. 3, and FIG. 4c illustrates the double regulated circuit of FIG. 6.

Figure 5A:
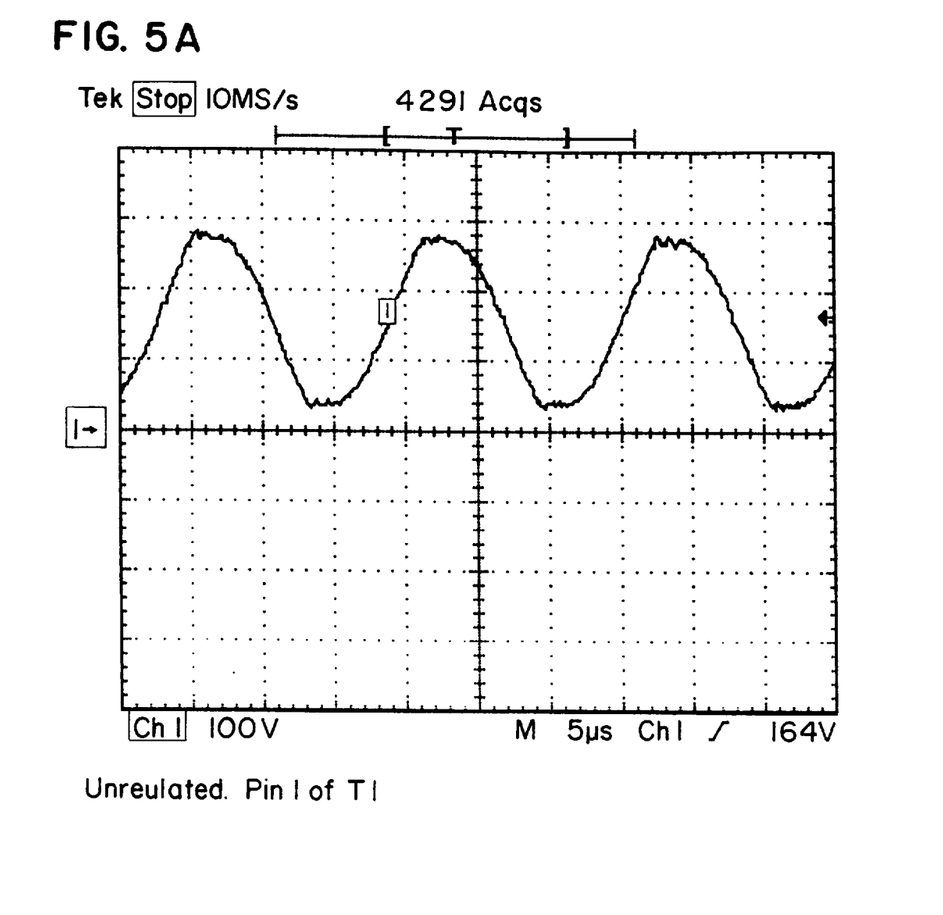
FIG. 5a is a graphical representation of the voltage waveform across the resonant capacitor 110 (unregulated circuit)
Figure 5B:
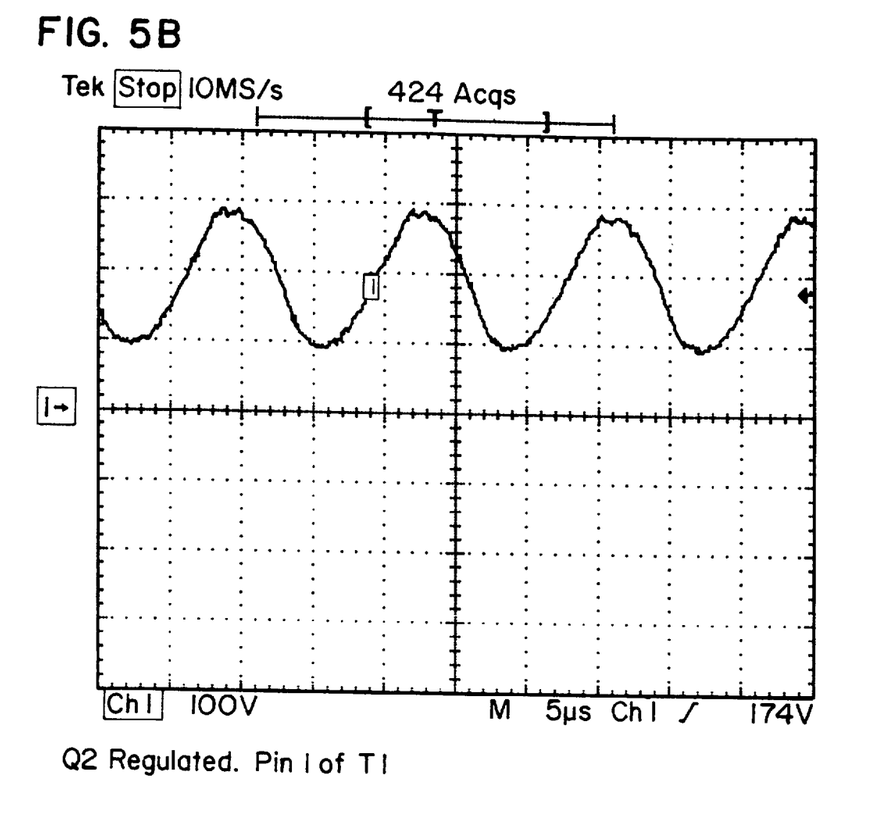
FIG. 5b is the voltage waveform across the resonant capacitor 110 (regulated circuit)
Figure 5C:
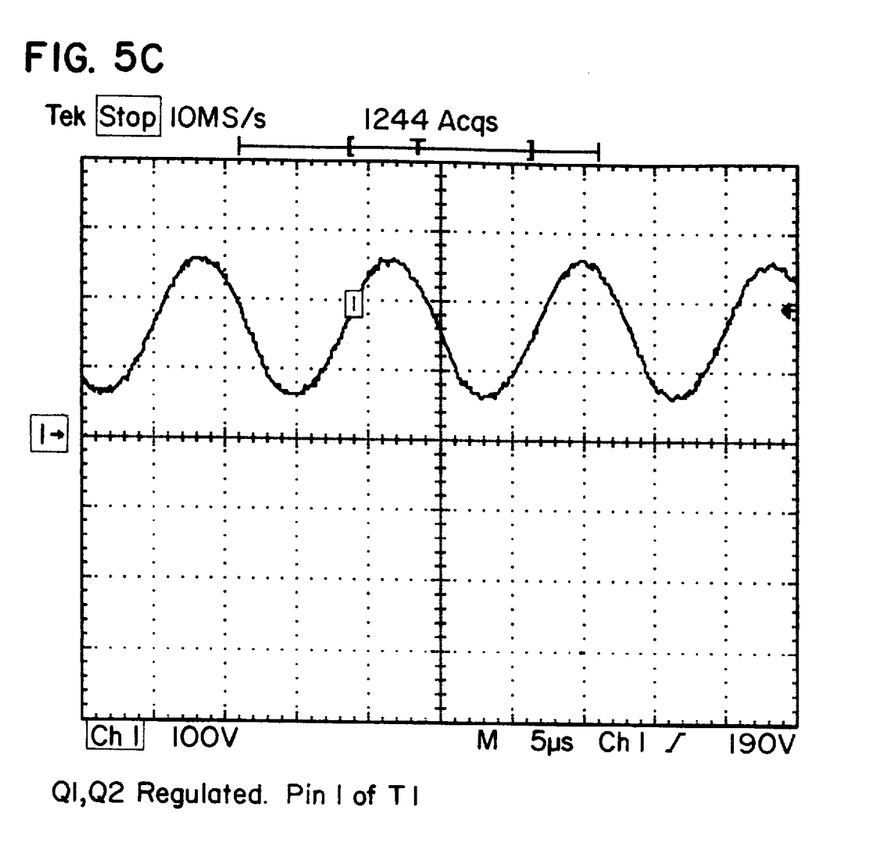
FIG. 5c is the voltage waveform across the resonant capacitor 110 (two-transistor regulated circuit)

FIGS. 5a, 5b, and 5c illustrate the voltage waveform at the transformer 107 pin 1 (best seen in FIGS. 3 and 6). FIG. 5a illustrates the unregulated circuit, FIG. 5b illustrates the single regulated transistor circuit of FIG. 3, and FIG. 5c illustrates the double regulated circuit of FIG. 6.

Figure 7A:
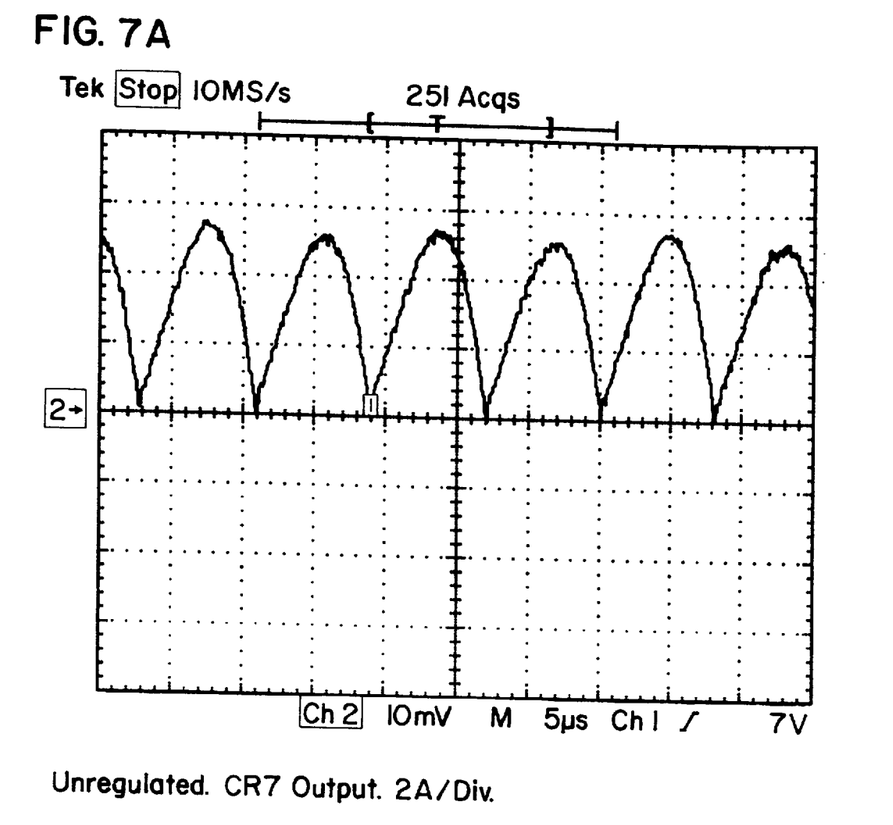
FIG. 7a is a graphical representation of the output current waveform of the unregulated circuit.
Figure 7B:
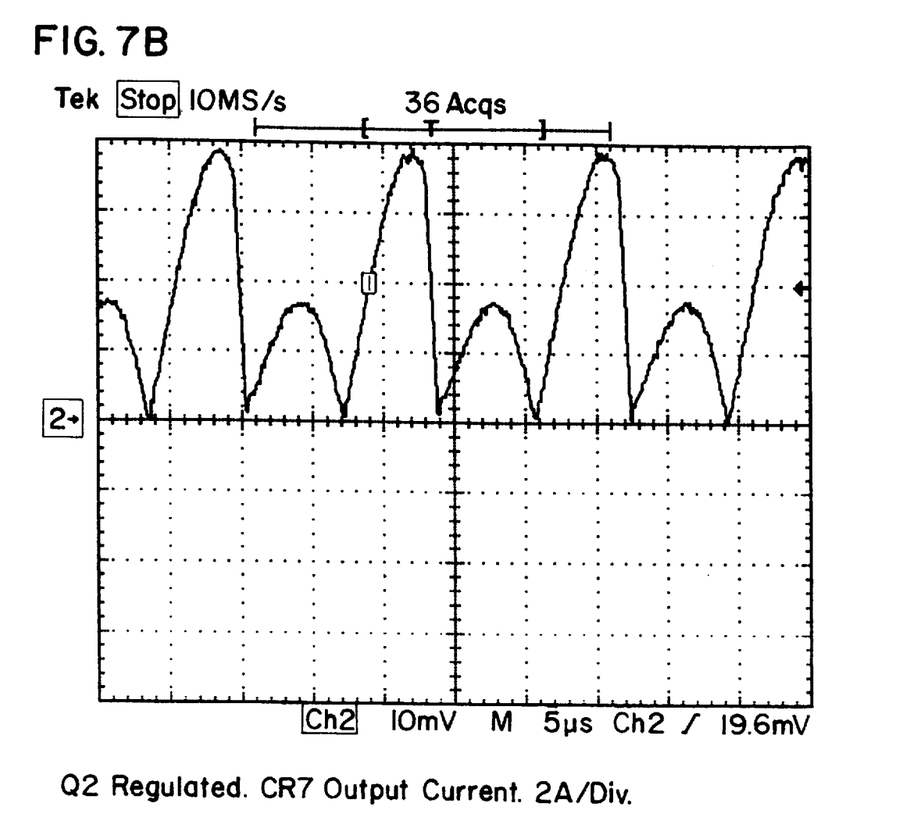
FIG. 7b is a graphical representation of the output current waveform with frequency control circuit applied to one transistor 105 (unregulated)
Figure 7C:
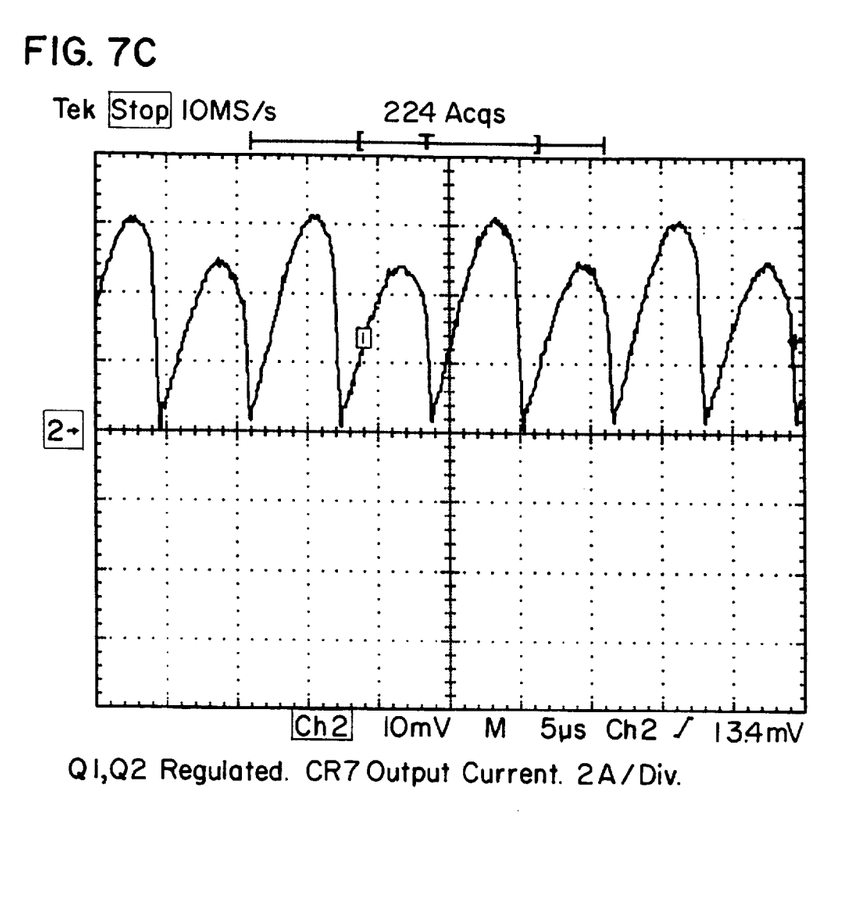
FIG. 7c is a graphical representation of the output current waveform with frequency control circuit applied to two transistors 104 and 105.

FIGS. 7a, 7b, and 7c illustrate the voltage waveform at the output load terminals. FIG. 7a illustrates the unregulated circuit, FIG. 7b illustrates the single regulated transistor circuit of FIG. 3, and FIG. 7c illustrates the double regulated circuit of FIG. 6.

In the preferred embodiment circuit, a larger leakage inductance transformer is utilized. While in many applications, such a transformer may be detrimental to the operation of the circuit, in the present application the leakage inductance is beneficial—since it is utilized by the circuit to provide current limit protection and soften the switching transitions. Such a transformer is less-expensive and easier to manufacture than other types of transformers. The transformer uses two separate bobbins. The bobbins are connected to one another by an iron core, or other magnetizing material. Since two bobbins are used, the windings are easier to manufacture (e.g., the windings require less insulating material than what is otherwise typically required in a high-frequency transformer). As noted above, the construction and automation of the winding is simpler than that of a more conventional high-frequency transformer using a single bobbin.

It should also be clear to those skilled in the art that further embodiments of the present invention may be made by those skilled in the art without departing from the teachings of the present invention.

What is claimed is:

1. A regulated direct current power converter, comprising:
   a) a single transformer having primary and load windings;
   b) at least two transistors in a half-bridge configuration cooperatively connected to said primary winding of said single transformer;
   c) a feedback path for producing oscillations in said transistors and including said primary winding of said single transformer;
   d) a load output connected to said load windings;
   e) error signal generation means, operatively connected across said load output, for generating an error signal related to the voltage across said load output; and
   f) frequency controller means, operatively connected to said error signal means and at least one of said transistors, for receiving said error signal and for varying the frequency of the energy in said converter by changing the on time of at least one of said transistors, wherein the error signal is decreased and the energy transfer characteristic to said load output is a function of the frequency of the energy.

2. The regulated direct current power converter of claim 1, further comprising:
   a) a series inductance effectively connected in series with said load output and a shunt inductance effectively connected in parallel with said load output; and
   b) a capacitor effectively connected in series with both said series inductance and said parallel inductance; and
   c) wherein said capacitor is connected between intermediate point on one of said primary winding and said source of direct current voltage.

3. The regulated direct current power converter of claim 2, further comprising:
   a) a multi-resonant circuit in said feedback path; and
   b) voltage limiting means connected between said source of direct current voltage and one end of said one primary winding for limiting the voltage across said capacitor to a voltage substantially less than said source of direct current voltage.

4. A regulated direct current power converter, comprising:
   a) a source of direct current voltage;
   b) a single transformer having a primary winding and a load winding;
   c) a pair of transistors connected in a half-bridge configuration across said primary winding of said single transformer;
   d) a feedback path for producing oscillations in said transistors and including said primary winding of said single transformer;
   e) a multi-resonant circuit in said feedback path and including a series inductance effectively connected in series with said load and a shunt inductance effectively connected and parallel with said load;
   f) a capacitor effectively connected in series with both said series inductance and said parallel inductance, wherein said capacitor is connected between an intermediate point on one of said primary winding and said source of direct current voltage;

g) voltage limiting means connected between said source of direct current voltage and one end of said one primary winding for limiting the voltage across said capacitor to a voltage substantially less than said source of direct current voltage;

h) error signal generation means, operatively connected across said load, for generating an error signal related to the voltage across said load; and i) frequency controller means, operatively connected to said error signal means and at least one of said pair of transistors, for receiving said error signal and for varying the frequency of the energy in said converter by changing the on time of at least one of said pair of transistors, wherein the error signal is decreased and the energy transfer characteristics to said load output is a function of the frequency of the energy.

5. The direct current power converter according to claim 4 further comprising means for initiating oscillations in said converter by applying a start-up signal to one of said transistors.

6. The direct current power converter according to claim 4 wherein said shunt inductance comprises the magnetizing inductance of said transformer and said series inductance comprises the leakage inductance of said transformer.

7. The direct current power converter according to claim 4 wherein said means for limiting the voltage across said capacitor comprises a pair of diodes for clamping the voltage across said capacitor to a voltage less than said direct current voltage.

8. The direct current power converter according to claim 4 wherein said voltage less than said direct current voltage is obtained by autotransformer action.

* * * * *